(12) United States Patent
Hoshina

(10) Patent No.: US 7,565,396 B2
(45) Date of Patent: Jul. 21, 2009

(54) SERVICE PROVIDING SYSTEM, SECOND CONNECTING PART, SERVICE PROVIDING DEVICE, SECOND CONNECTING PART CONTROL PROGRAM AND SERVICE PROVIDING DEVICE CONTROL PROGRAM

(75) Inventor: Masaki Hoshina, Suwa (JP)

(73) Assignee: Seiko Epson Corporation (JP)

( * ) Notice: Subject to any disclaimer, the term of this patent is extended or adjusted under 35 U.S.C. 154(b) by 1398 days.

(21) Appl. No.: 10/805,501

(22) Filed: Mar. 19, 2004

(65) Prior Publication Data
US 2005/0044245 A1    Feb. 24, 2005

(30) Foreign Application Priority Data
Mar. 20, 2003    (JP)    ............................. 2003-077645

(51) Int. Cl.
*G06F 15/16*    (2006.01)
(52) U.S. Cl. .................. 709/202; 709/245; 709/227; 709/242; 711/114; 711/112; 707/9; 707/10
(58) Field of Classification Search ................. 709/202, 709/223, 227; 714/162; 711/114, 112; 707/9, 707/10
See application file for complete search history.

(56) References Cited

FOREIGN PATENT DOCUMENTS

| JP | 06-231361 | 8/1994 |
|---|---|---|
| JP | 07-143610 | 6/1995 |
| JP | 08-301396 | 11/1996 |
| JP | 2001-338335 | 12/2001 |
| JP | 2002-189534 | 7/2002 |

*Primary Examiner*—Thanh Tammy Nguyen
(74) *Attorney, Agent, or Firm*—Harness, Dickey & Pierce, P.L.C.

(57) ABSTRACT

A service providing system comprises a connecting-part-equipped electric apparatus, a service providing device, and a settlement server. The connecting-part-equipped electric apparatus comprises a contactless identification tag, a connecting part and an electric apparatus. The contactless identification tag comprises a data receiving part and a data sending part, a data control part, a status notifying part and a display part. The service providing device comprises a data receiving part and a data sending part, a data control part, an authenticating part, an availability determining part, a determining result notifying part, a display part, a service providing part, a first connecting part and a charging fee calculating part.

14 Claims, 8 Drawing Sheets

SERVICE PROVIDING SYSTEM, SECOND CONNECTING PART, SERVICE PROVIDING DEVICE, SECOND CONNECTING PART CONTROL PROGRAM AND SERVICE PROVIDING DEVICE CONTROL PROGRAM

RELATED APPLICATIONS

This application claims priority to Japanese Patent Application No. 2003-077645 filed Mar. 20, 2003 which is hereby expressly incorporated by reference herein in its entirety.

BACKGROUND

1. Field of the Invention

The present invention relates to a service providing system for providing a predetermined service to an apparatus through a second connecting part, and particularly, to a service providing system that can easily determine whether the service is available to the second connecting part or not, by connecting a first connecting part, provided on the service providing device to provide a predetermined service, and the second connecting part whose one end is connected with the apparatus.

2. Description of the Related Art

Conventionally, there is an electric automatic vending machine that can charge an electric apparatus by paying at an out-of-home place (Refer to Japanese laid-open patent publication No. 6-231361). From this automatic vending machine, electricity can be purchased by prepaid cards such as magnetic card and IC card as well as actual money, and electricity is supplied to the electric apparatus, connected to the electric automatic vending machine, depending on the set electricity amount (set by money amount), amount of actual money received into a coin receiver or remaining amount of the prepaid card received into the prepaid card receiver. Then, when supply of the set electricity amount is completed, when supply of electricity by money amount received into the coin receiver is completed, or when the prepaid card received into a prepaid card receiver has no remaining amount of money, a comparator detects these situations, and a signal is input to a control part, and supply of electricity to the connected electric apparatus is stopped by activating an electromagnetic switch by controlling the control part.

Furthermore, there is a charging device for electric vehicles that can charge electricity to an electric vehicle by paying (Refer to Japanese laid-open patent publication No. 7-143610). This charging device for electric vehicles houses a charging cable, having a connector on its end, in the lid, unlocks the lid based on the customer data read from memory card (IC card) by a card reader/writer, and locks the lid by a charge ending signal and a lid close signal, whereby opening and closing of the lid is controlled by the memory card.

Furthermore, there is a prepaid card type settlement device which can settle fees such as electricity fee and gas fee paid for usage of media supplied from a lifeline (Refer to Japanese laid-open patent publication No. 13-338335). This prepaid card type settlement device comprises a watt-hour meter with a digital pulse output and an electromagnetic interrupter, which are connected between a receiving end of power and a load side, a control part connected to the watt-hour meter and the electromagnetic interrupter, and a card reader/writer configured to be a card inserting type, wherein the watt-hour meter with the digital pulse output measures the watt-hours supplied from a power network, and the money amount corresponding to the watt-hours is subtracted from the prepaid card (contactless IC card) inserted into the card reader.

However, in all of the above Patent Documents, when a connected apparatus receives service such as electricity supply, an IC card such as prepaid card is required as well as a connecting means to connect the apparatus to a device which provides service. When the IC card is lost, or one forgets to bring the IC card to a place where the device providing service exists, the IC card can be purchased at the site if it is disposable, however, if the device requires a specific IC card, in which a card user is registered as a member and customer information is stored, service of electric supply cannot be received.

Furthermore, as for connection of an apparatus to a service providing device which provides service, the above Patent Documents do not describe countermeasures for misconnection of the apparatus such as misconnection of an apparatus which does not correspond to the service or misconnection to a connecting part when the service providing part has a plurality of connecting parts. Thus, the present invention has been developed in view of the unsolved problems which the related arts possess, and is intended to provide a service providing system capable of easily determining the service availability of the service receiving apparatus to the service providing device, a second connecting part, a service providing device, a second connecting part control program and a service providing device control program.

SUMMARY

In order to achieve the above-described object, the present invention relates to a service providing system, which provides a predetermined service to an apparatus through a second connecting part by connecting a first connecting part, provided on a service providing system, and one end of the second connecting part, whose other end is connected to a predetermined apparatus, wherein the second connecting part comprises: an identification information storage means for storing identification information for the second connecting part; and an identification information sending means for sending the identification information to the service providing system in response to a request from the service providing device. The service providing device comprises: an identification information acquiring means for acquiring identification information from the second connecting part approaching the first connecting part; a first connecting part information storage means for storing information of the first connecting part; an availability determining means for determining whether the first connecting part is available to the second connecting part or not, based on the identification information acquired by the identification information acquiring means and the information of the first connecting part; and a determining result notifying means for notifying information indicating a determining result by the availability determining means to a system-user.

With this configuration, as for the first invention, the second connecting part can store the identification information of the second connecting part by the identification information storage means, and can send the identification information to the service providing device in response to the request from the service providing device, wherein the service providing device can acquire the identification information from the second connecting part approaching the first connecting part by the identification information acquiring means, and can store the information of the first connecting part by the first connecting part information storage means, and can determine whether the first connecting part is available to the second connecting part or not by the availability determining means, based on the identification information acquired by the identification information acquiring means and information of the first connecting part, and can notify the information indicating the determining result by the availability determining means to the system-user by the determining result notifying means.

Accordingly, a system-user, such as the possessor of the predetermined apparatus, can know whether the second connecting part is connectable to the first connecting part by bringing the second connecting part, whose one end is connected to the predetermined apparatus, closer to the first connecting part provided on the service providing device. Therefore, the possibility of connecting the second part to a wrong connecting destination can be reduced.

The predetermined apparatus means a portable information processing apparatus such as PC (Personal Computer), cellular phone and PDA (Personal Digital Assistant), an apparatus which is operated by electricity as a power source, an apparatus which can charge electricity, or an apparatus which can send or receive information by an electric signal, such as a game machine, charging type battery, electric vehicle, audio apparatus, video apparatus, other home electric apparatus and industrial electric apparatus.

Furthermore, the first connecting part is a socket for supplying electricity in factory, store or public place, or a connector for a LAN cable connection to connect to an information distributing device connected to a network such as the Internet, or other connecting terminal for outputting an audio signal such as music and songs, or others that can be electrically coupled to the predetermined apparatus when connected to the second connecting part.

In this application, there is an expression "one end is connected to". This means, for example, that if a connector or the like, which is to be a second connecting part, has pins or metallic parts for mounting onto a printed board, these pins and parts are the one end. The state of the "one end is connected to" is a state that is incorporated into the predetermined apparatus in such a manner of being mounted onto the printed board of the predetermined apparatus side through pins or metallic parts for mounting, which are the one end. An inserting port, into which a plug or the like is inserted, of the second part becomes the other end.

Furthermore, for example, if the predetermined apparatus is a charging type battery, the other end of the second connecting part is its positive terminal or negative terminal. In this case, the expression of "one end is connected" means a state that the metallic part inside of a battery of each terminal contacts liquid in the battery. Furthermore, for example, if the second connecting part exists on one end and the other end of a cable like a commercially available LAN cable, the expression of "one end is connected" means a state that a connecting part on one end is coupled to the predetermined apparatus.

Furthermore, the determination result notifying means notifies a determination result to a system-user by light, sound or image (including letters) display. For example, if the approaching second connecting part corresponds to the right one, a blue light lights up, or sound or a sound message indicating the right one is output, or a blue color image is displayed. On the other hand, if the approaching second connecting part does not correspond the right one, a red light lights up, or sound or a sound message indicating the wrong one (i.e., not the right one) is output, or a red color image is displayed.

Furthermore, the relation between the first connecting part and the second connecting part can also be considered to be that either one of the connecting parts is a plug and the other one is a plug-inserting port. The plug is an inserting fixture used to connect or cut a circuit in electrical machines, and is generally installed to a detachable part such as a cable, and inserted into a plug-inserting port such as a jack, outlet, receptacle, socket and/or plug socket. The plug also includes a fixture called by other names such as pin and connector whatever they are electrically coupled.

Furthermore, the predetermined service is thought to be electric supply service or providing service of data such as video data and music data to a predetermined apparatus connected through the second connecting part. Furthermore, as for the second invention, in addition to the first invention, the identification information includes information on the possessor of the second connecting part, and comprises a user information storage means for storing information of a user who can use the predetermined service, and an authenticating means for authenticating the possessor based on the information regarding the possessor of the second connecting part and the information of the user, wherein the availability determining means determines whether the first connecting part is available to the second connecting part or not also based on the authentication result of the authenticating means.

That is, the identification information of the second connecting part includes the information regarding the possessor of the second connecting part. The user information storage means can store information of the user who can use the predetermined service, the authenticating means can authenticate the possessor based on the information regarding the possessor of the second connecting part and information of the user, and the availability determining means can determine whether the first connecting part is available to the second connecting part also based on the authenticating result of the authenticating means.

Accordingly, depending on whether the possessor of the second connecting part is stored by the user information storage means or not, the possessor is authenticated, and if the possessor is not authenticated, it is possible to notify to the user that the first connecting part is not available, thereby allowing for management of customer information. Furthermore, as for the third invention, in addition to the first or second invention, the service providing device comprises a service providing means for providing or shutting down the predetermined service based on the determining result of the availability determining means.

That is, the service providing device can provide or shut down the predetermined service based on the determining result of the availability determining means by the service providing means. Therefore, the service can be withheld until the second connecting part corresponding to the first connecting part is approached (or connected), or on the other hand, the service can be shut down when the second connecting part, not corresponding to the first connecting part, is approached (or connected). If the service is the supply of electricity, this can prevent electric shock by contact to the first connecting part, and accidents such as electric shock by an improper connection.

Furthermore, as for the fourth invention, in addition to any of the first through third inventions, the second connecting part comprises a contactless identification tag, wherein the contactless identification tag includes the identification information storage means, the identification information sending means and a power generation means for generating drive power by an electromagnetic wave sent from the service providing device, and the service providing device includes an electromagnetic wave sending means for power supply for sending an electromagnetic wave for supplying power to the second connecting part approaching the first connecting part.

That is, the second connecting part comprises a contactless identification tag, wherein the contactless identification tag can: store the identification information of the second connecting part by the identification information storage means; can send the identification information to the service providing device in response to the request from the service providing device by the identification information sending means; and can generate drive power from the electromagnetic wave sent from the service providing device by the power generation means, wherein the service providing device can send an electromagnetic wave for supplying power to the second connecting part approaching the first connecting part by the electromagnetic wave sending means for power supply.

Accordingly, for example, if the second connecting part is a plug, simply by mounting a contactless identification tag on the plug, it is possible to know whether the plug-inserting port corresponds to the plug when the plug approaches the plug-inserting port, which is the first connecting part, thereby allowing the system-user to be prevented from inserting a plug into an improper plug inserting port. In addition, because this can be used for the system simply by mounting a contactless identification tag on a plug, the present invention can be easily applied to various kinds of plugs. In addition, because the contactless identification tag can generate drive power from an electromagnetic wave for supplying power from the service providing device, a power source such as battery is not necessary to operate the contactless identification tag.

The contactless identification tag is preferably one such as used in an RFID (Radio Frequency Identification) system, and is generally called a data carrier or the like. There are various kinds of shapes such as a label type, a card type, a coin type, and a stick type. These shapes closely relate to the applications in which they are used, and, for example, things that people carry include a card shape or a key holder shape fabricated from a label shape. As for a semiconductor carrier ID, a stick type is the most popular. As for the ones sewn to linen-related clothes, a coin type is the most popular.

The contactless identification tag is equipped with a storage area used for data-read only or where data read/write can be carried out without constraint, and furthermore, there are some that can be operated by contactless power transfer from an antenna side even if a battery is not provided. Moreover, the RFID system is an ID system which uses a radio wave and an electromagnetic wave as a medium, wherein the contactless identification tag has three features of: (1) a size that is easy to carry, (2) storing information to an electronic circuit, and (3) communicating by contactless communication.

Accordingly, the RFID system is used for integrating people, an article, a car or the like having a contactless identification tag and their information. That is, people, an article, and a car can take out required information at any time and in a certain place, and can write in new information as required. Moreover, as for a typical RFID, there are four methods as follows: an electromagnetic-coupling method to carry out communication with a contactless identification tag by using mainly mutual induction of a coil by the alternating current magnetic field; an electromagnetic-induction method to carry out communication with a contactless identification tag by using mainly an electromagnetic wave of 250 kHz or less, or a long and medium wave band of 13.56 MHz; a microwave method to carry out data communication between an antenna at the side of a reader/writer and a contactless identification tag by a microwave of a 2.45 GHz band; and an optical method which arranges an LED as a generation source of light, and arranges a photo transistor or the like as a light receiver, and carries out communication with a contactless identification tag by using light transmission in space.

There are four kinds of access methods as follows: a single access mode, a FIFO (First In First Out) access mode, a multi-access mode, and a selective access mode. As for the single access mode, the number of contactless identification tags that exist within an antenna communication range is one, therefore when a plurality of contactless identification tags exist within the antenna communication range, a communication error occurs and thus the communication can not be made.

As for the FIFO access mode, the communication can be made, by taking turns, with contactless identification tags that enter the communication range of an antenna sequentially. Because an access prohibition process is carried out on the contactless identification tag, which finished the communication, even if a plurality of tags, which finished the communication, exist within the communication range of the antenna, the communication can be made only if one new tag enters the communication range of the antenna. However, if contactless identification tags simultaneously enter the communication range, a communication error occurs and thus the communication can not be made. Once the contactless identification tag, whose access has been prohibited, goes outside the communication range, communication can be made again.

As for the multi-access mode, the communication with all contactless identification tags can be made, even if a plurality of contactless identification tags exist within the communication range of an antenna. The selective access mode, where the communication can be made with a specific contactless identification tag among a plurality of contactless identification tags that exist within the communication range, can be realized by a command to assign numbers to the contactless identification tags within the communication range, and a command to carry out the communication with a specific contactless identification tag based on the assigned number.

As for the fifth invention, in addition to any of the first through fourth inventions, the second connecting part comprises a determining result information receiving means for receiving information including the determining result of the availability determining means sent from the service providing device, and a status notifying means for notifying the predetermined status of the second connecting part to the first connecting part to the system-user based on the information including the determining result received by the determining result information receiving means, wherein the service providing device comprises a determining result information sending means for sending information including the determining result made by the availability determining means to the second connecting part approaching the first connecting part.

That is, the second connecting part can receive information including the determining result of the availability determining means, sent from the service providing device, by the determining result information receiving means, and can notify a predetermined status of the second connecting part to the first connecting part to the system-user based on the information including the determining result received by the determining result information receiving means, wherein the service providing device can send information including the determining result by the availability determining means to the second connecting part approaching the first connecting part, by the determining result information sending means.

Accordingly, for example, by moving the second connecting part toward the first connecting part, whether the first connecting part corresponds to the second connecting part or not can be known at the second connecting part. Therefore, it is possible to prevent the second connecting part from being connected to an improper connecting part. The determination result notifying means notifies a determination result to a system-user by light, sound or image (including letters) display. For example, if the to-be-approached first connecting part corresponds to the right one, a blue light lights up, or sound or a sound message indicating the right one is output, or a blue color image is displayed. On the other hand, if the to-be-approached first connecting part does not correspond the right one, a red light lights up, or sound or a sound message indicating the wrong one is output, or a red color image is displayed.

Furthermore, as for the sixth invention, in addition to any of the second through the fifth inventions, the service providing device comprises a price calculating means for calculating a price to provide the predetermined service for the apparatus, and has a feature of settling a charging fee of the predetermined service to the possessor of the identification information based on the calculating result of the price calculating means and the identification information regarding the possessor.

That is, the service providing device can calculate the price to provide the predetermined service for the apparatus by the price calculating means, and the service providing system can settle a charging fee of the predetermined service to the possessor of the identification information based on the calculating result of the price calculating means and the identification information regarding the possessor.

Accordingly, if a bank account number, which the user uses, is available as information regarding the possessor, the entire service from providing service to settlement of charging fees can be conducted even without things, such as a card, other than the second connecting part. Furthermore, the seventh invention is for the second connecting part in the first invention, wherein the second connecting part comprises an identification information storage means for storing the identification information of the second connecting part, and an identification information sending means for sending the identification information to the service providing device in response to the request from the service providing device.

The present invention is for the second connecting part in the first invention, and thus the description of the effect thereof will be omitted so as not to be duplicated. Furthermore, as for the eighth invention, in addition to the seventh invention, the identification information includes information of the user of the second connecting part. The present invention is for the second connecting part in the second invention, and thus the description of the effect thereof will be omitted so as not to be duplicated.

Furthermore, the ninth invention, in addition to the seventh or eighth invention, comprises a contactless identification tag, wherein the contactless identification tag comprises the identifying means, the identification information sending means, and a power generating means for generating drive power from an electromagnetic wave sent from the service providing device. The present invention is for the second connecting part in the fourth invention, and thus the description of the effect thereof will be omitted so as not to be duplicated.

Furthermore, the tenth invention, in addition to any of the seventh through ninth inventions, comprises a determining result information receiving means for receiving information including the determining result of the availability determining means sent from the service providing device, and a status notifying means for notifying the predetermined status of the second connecting part to the first connecting part to a system-user based on the information including the determining result received by the determining result information receiving means.

The present invention is for the second connecting part in the fifth invention, and thus the description of the effect thereof will be omitted so as not to be duplicated. Furthermore, the eleventh invention is for the service providing device in the first invention, comprising an identification information acquiring means for acquiring the identification information from the second connecting part approaching the first connecting part, a first connecting part information storage means for storing information of the first connecting part, an availability determining means for determining whether the first connecting part is available to the second connecting part or not based on the identification information acquired by the identification information acquiring means and the information of the first connecting part, and a determining result notifying means for notifying the information indicating the determining result of the availability determining means to a system-user.

The present invention is for the service providing device in the first invention, and thus the description of the effect thereof will be omitted so as not to be duplicated. Furthermore, the twelfth invention, in addition to the eleventh invention, comprises a user information storage means for storing information of the user who can use the predetermined service, and an authenticating means for authenticating the possessor based on the information regarding the possessor of the second connecting part and information of the user, wherein the availability determining means determines whether the first connecting part is available to the second connecting part or not also based on the authenticating result of the authenticating means.

The present invention is for the service providing device in the second invention, and thus the description of the effect thereof will be omitted so as not to be duplicated. Furthermore, the thirteenth invention, in addition to the eleventh or twelfth invention, comprises a service providing means for providing or shutting down the predetermined service based on the determining result of the availability determining means.

The present invention is for the service providing device in the third invention, and thus the description of the effect thereof will be omitted so as not to be duplicated. Furthermore, the fourteenth invention, in addition to any of the eleventh or thirteenth invention, comprises an electromagnetic wave sending means for power supply for sending an electromagnetic wave for power supply to the second connecting part approaching the first connecting part.

The present invention is for the service providing device according to the fourth invention, and thus the description of the effect thereof will be omitted so as not to be duplicated. Furthermore, the fifteenth invention, in addition to any of the eleventh through fourteenth inventions, comprises a determining result information sending means for sending information including the determining result by the availability determining means to the second connecting part approaching the first connecting part.

The present invention is for the service providing device in the fifth invention, and thus the description of the effect thereof will be omitted so as not to be duplicated. Furthermore, the sixteenth invention, in addition to any of the twelfth through fifteenth inventions, comprises a price calculating means for calculating a price to provide the predetermined service to the apparatus.

The present invention is for the service providing device in the sixth invention, and thus the description of the effect thereof will be omitted so as not to be duplicated. Furthermore, the seventeenth invention is for a program to control the seventh invention, and comprises an identification information storage step for storing the identification information of the second connecting part, and an identification information sending step for sending the identification information to the service providing device in response to the request from the service providing device.

The present invention is for a program for controlling the seventh invention, and thus the description of the effect thereof will be omitted so as not to be duplicated. Furthermore, the eighteenth invention is a program for controlling the eleventh invention, and comprises an identification information acquiring step for acquiring the identification information from the second connecting part approaching the first connecting part, a first connecting part information storage step for storing information of the first connecting part, an availability determining step for determining whether the first connecting part is available to the second connecting part or not based on the identification information acquired in the identification information acquiring step, and a determining result notifying step for notifying information indicating the determining result of the availability determining step.

The present invention is for a program for controlling the eleventh invention, and thus the description of the effect thereof will be omitted so as not to be duplicated. The present invention, additionally, can employ the following aspects.

(1) The second connecting part control program according to the seventeenth invention, wherein the identification information includes information regarding the possessor of the second connecting part.

(2) The second connecting part control program according to the seventeenth invention or the above number (1), comprising a determining result information receiving step for receiving information including the determining result of the availability determining means sent from the service providing device, and a status notifying step for notifying the predetermined status of the second connecting part to the first connecting part to the system-user based on the information including the determining result received in the determining result information receiving step.

(3) The service providing device control program according to the eighteenth invention, comprising a user information storage step for storing information regarding the user who can use the predetermined service, and an authenticating step for authenticating the possessor based on the information regarding the possessor of the second connecting part and the information regarding the user, wherein, in the availability determining step, whether the first connecting part is available to the second connecting part or not is determined also based on the authenticating result of the authenticating step.

(4) The service providing device control program according to the eighteenth invention or according to the above number (3), comprising a service providing step for providing or shutting down the predetermined service based on the determining result in the availability determining step.

(5) The service providing device control program according to any of the eighteenth invention and the above numbers (1) through (4), comprising a power supply electromagnetic wave sending step for sending an electromagnetic wave for power supply to the second connecting part approaching the first connecting part.

(6) The service providing device control program according to any of the eighteenth invention and the above numbers (1) through (5), comprising a determining result information sending step for sending information including the determining result of the availability determining step to the second connecting part approaching the first connecting part.

The service providing device control program according to any of the above numbers (3) through (6), comprising a price calculating step for calculating a price to provide the predetermined service to the apparatus.

DETAILED DESCRIPTION

Figure 1:
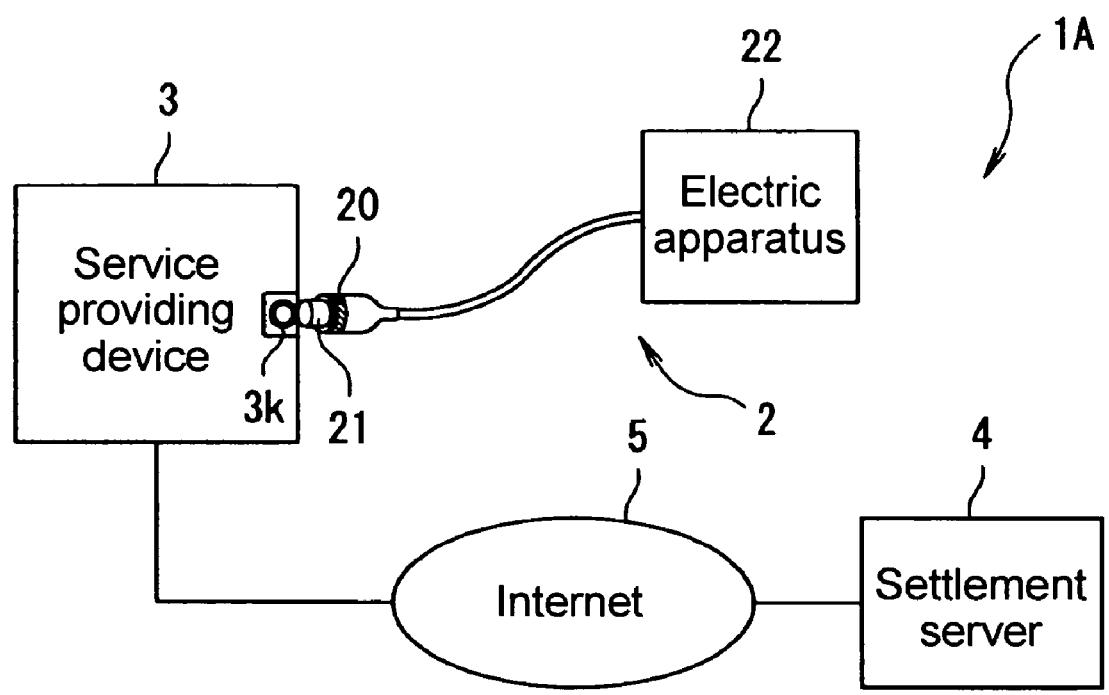
FIG. 1 shows a schematic structure of a service providing system 1A according to the present invention.

Hereinafter, embodiments of the present invention will be described with reference to the drawings. FIG. 1 through FIG. 10 are embodiments of a service providing system according to the present invention. First of all, a structure of a service providing system according to the present invention will be described with reference to FIG. 1. FIG. 1 shows a schematic structure of a service providing system 1A according to the present invention.

As shown in FIG. 1, the service providing system 1A includes a connecting-part-equipped electric apparatus 2, a service providing device 3, a settlement server 4, and a wide area network in the form of the Internet 5. The connecting-part-equipped electric apparatus 2 is an apparatus including a second connecting part 21 provided with a contactless identification tag 20, and can receive a predetermined service from the service providing device 3 by connecting the second connecting part 21 to a first connecting part 3k of the service providing device 3. Additionally, the connecting-part-equipped electric apparatus 2 functions to send the identification information regarding the possessor of the connecting-part-equipped electric apparatus 2 and the identification information of the second connecting part 21 to the service providing device 3 in response to a request from the service providing device 3, and to notify information for preventing the second connecting part from being connected to a wrong first connecting part to the user. The detail structure will be described later.

The service providing device 3 has a first connecting part 3k, and functions: to determine whether the first connecting part 3k is available to the second connecting part 21 or not by the first connecting part 21 approaching the first connecting part 3k and notify the determining result to the system-user; to provide the predetermined service to the connected connecting-part-equipped electric apparatus 2 of the second connecting part 21 by connecting the available second connecting part 21 to the first connecting part 3k; and to calculate a service charging fee based on the content of the service which the connected connecting-part-equipped electric apparatus 2 used, and to settle the service charging fee by using a settlement server 4 on the Internet 5. In addition, it also functions to notify the determining result to the system-user. The detailed structure will be described later.

The settlement server 4 has a database of information for customers who can use service from the service providing device 3, and functions to authenticate the possessor of the connecting-part-equipped electric apparatus 2 based on identification information acquired from the second connecting part 21 approaching the first connecting part 3k of the service providing device 3, and to settle the service charging fee based on customer information such as banking account number and credit card number.

The Internet 5 is a wide area network, in which various networks are interconnected world wide, and can be connected to a terminal apparatus such as PC through a telephone line and a dedicated line, and information published by WWW (World Wide Web) servers or the like, connected to the network, can be browsed by a dedicated browser software, and the Internet 5 is used in various applications such as net business.

Figure 2:
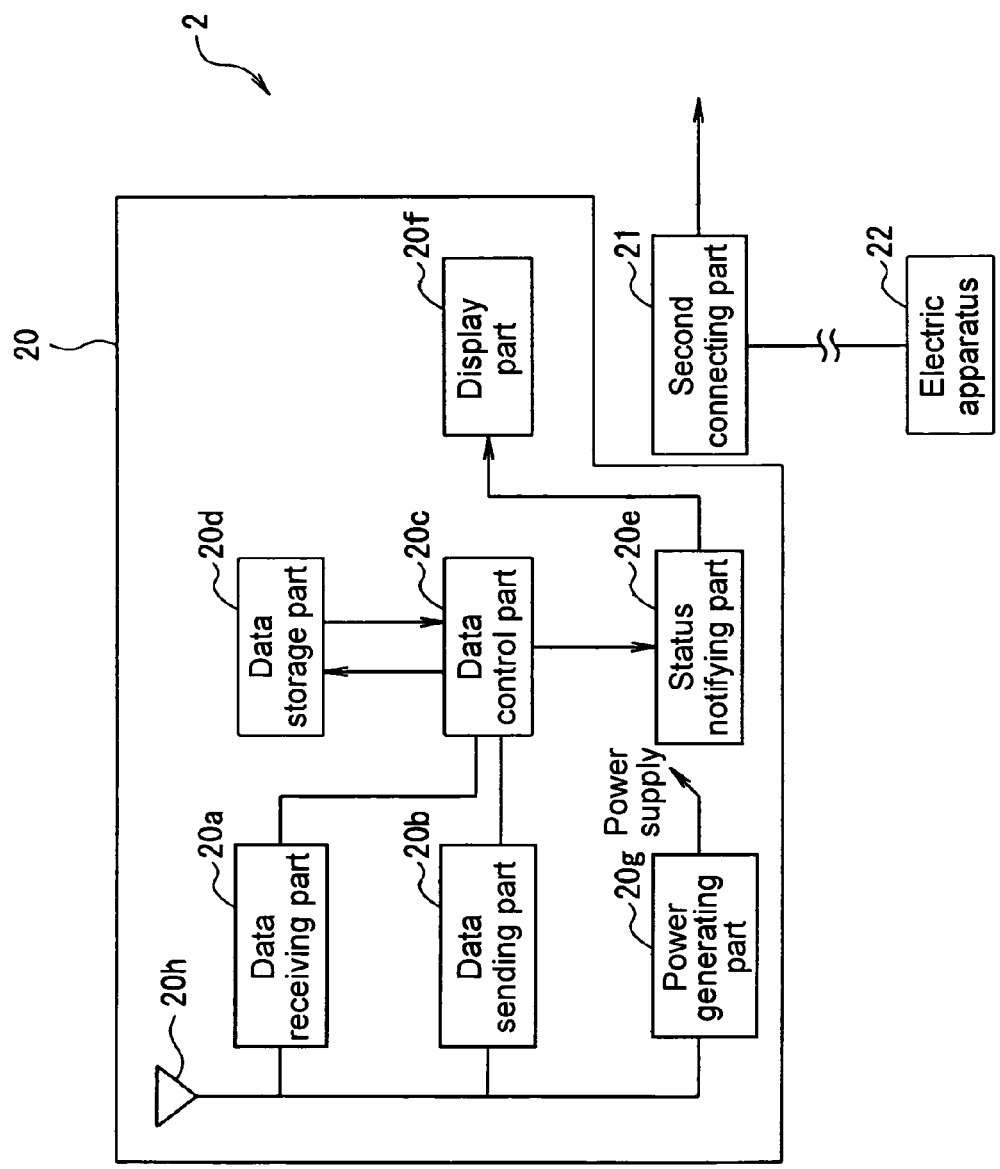
FIG. 2 shows a block diagram illustrating a detailed structure of a connecting-part-equipped electric apparatus 2.

The detailed structure of the connecting-part-equipped electric apparatus 2 will be described with reference to FIG. 2. FIG. 2 shows a block diagram illustrating a detailed structure of the connecting-part-equipped electric apparatus 2. As shown in FIG. 2, the connecting-part-equipped electric apparatus 2 comprises the contactless identification tag 20, the connecting part 21 and the electric apparatus 22. The contactless identification tag 20 comprises a data receiving part 20a, a data sending part 20b, a data control part 20c, a data storage part 20d, a status notifying part 20e, a display part 20f and a power generating part 20g.

The data receiving part 20a functions to receive data sent from the service providing device 3 by an electromagnetic induction method using an electromagnetic wave of 13.56 MHz. The data sending part 20b functions to send the predetermined data such as identification information stored in the data storage part 20d to the service providing device 3 by an electromagnetic induction method using an electromagnetic wave of 13.56 MHz.

The data control part 20c controls data receiving processing by the data receiving part 20a, and data sending processing by the data sending part 20b. In addition, the data control part 20c analyzes the received data from the service providing device 3 and sends the analyzed result to a status notifying part 20e, or reads the corresponded data stored in the data storage part 20d, and sends it to the status notifying part 20e. In the present embodiment, the data control part 20c sends the identification information stored in the data storage part 20d to the service providing device 3 in response to a response request command from the service providing device 3.

The data storage part 20d is a non-volatile semiconductor memory such as a flash memory, and retains data stored once without supplying power. A protective area (data un-rewritable area) of the data storage part 20d stores data necessary for operation such as information of the first connecting part 3k corresponding to each contactless identification tag 20 and specific information (identification information for possessor in the present embodiment) for the each contactless identification tag 20.

The status notifying part 20e sends a control command to the display part 20f based on the information received from the service providing device 3 through the data receiving part 20a. The display part 20f comprises a plurality of light-emitting elements, and notifies a status of the second connecting part 21 to the service providing device 3 (connectable or not) to a user of the connecting-part-equipped electric apparatus 2 by illuminating the light-emitting elements based on the control command from the status notifying part 20e. For example, when the second connecting part 21 approaches an available first connecting part 3k, the light-emitting element is visually illuminated to blue, and when it approaches a plug-inserting part having inserting port which does not correspond to the right one, the light-emitting element is visually illuminated to red. It is also possible to blink the light-emitting element depending on the situation. Additionally, it is also possible to display letters or an image by illumination of light-emitting elements by the control command.

Figure 3:
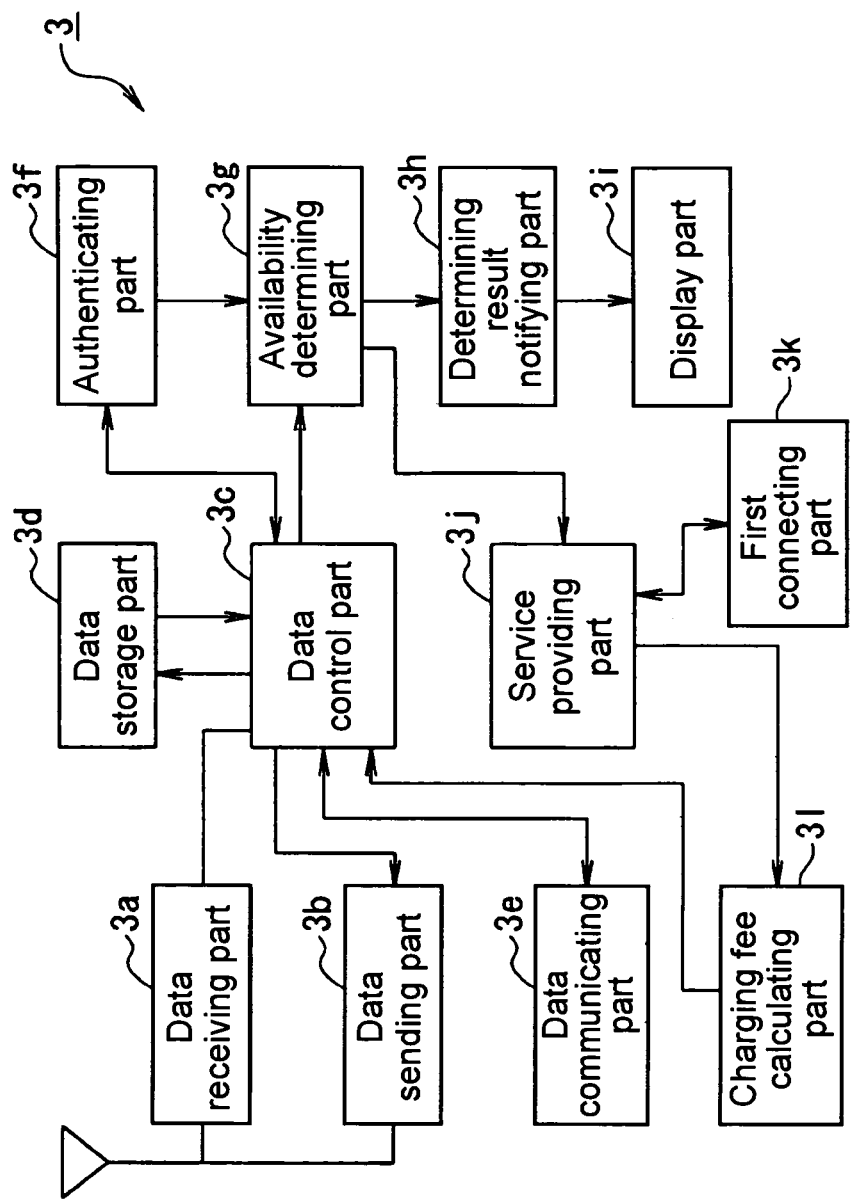
FIG. 3 shows a block diagram illustrating a detailed structure of a service providing device 3.

The detailed structure of the service providing device 3 will be described with reference to FIG. 3. FIG. 3 shows a block diagram illustrating a detailed structure of the service providing device 3. As shown in FIG. 3, the service providing device 3 comprises the data receiving part 3a, the data sending part 3b, the data control part 3c, the data storage part 3d, the data communicating part 3e, the authenticating part 3f, the availability determining part 3g, the determining result notifying part 3h, the display part 3i and the service providing part 3j, the first connecting part 3k and a charging fee calculating part 3l.

The data receiving part 3a functions to receive data sent from the connecting-part-equipped electric apparatus 2 by the electromagnetic induction method. The data sending part 3b functions to send the predetermined data to the connecting-part-equipped electric apparatus 2 by the electromagnetic induction method. The data control part 3c integrally controls operation of each part of the service providing device 3 by executing a control program, stored in the data storage part 3d, by CPU (Central Processing Unit), which is not shown. The data control part 3c controls a data communication processing by the electromagnetic induction method using the data receiving part 3a and data sending part 3b, such as data receiving from the connecting-part-equipped electric apparatus 2 and data sending to the connecting-part-equipped electric apparatus 2. In addition, the data control part 3c controls a processing to send data received from the connecting-part-equipped electric apparatus 2 to each part.

The data storage part 3d stores program, and also stores data received from the connecting-part-equipped electric apparatus 2 and data used for processing in each part. The data communicating part 3e functions to carry out data communication with the settlement server 4 through the Internet 5. The authenticating part 3f authenticates the possessor of the connecting-part-equipped electric apparatus 2 using customer information database of the settlement server 4 based on the identification information regarding the possessor received from the connecting-part-equipped electric apparatus 2.

The availability determining part 3g determines whether the second connecting part 21 is connectable to the first connecting part 3k or not, based on the identification information of the second connecting part 21 received from the connecting-part-equipped electric apparatus 2 and the authenticating result by the authenticating part 3f. When connection is not physically possible, for example, due to a difference of the standards between the second connecting part 21 and the first connecting part 3k, or when the possessor is not authenticated, they are determined to be not available.

Figure 4:
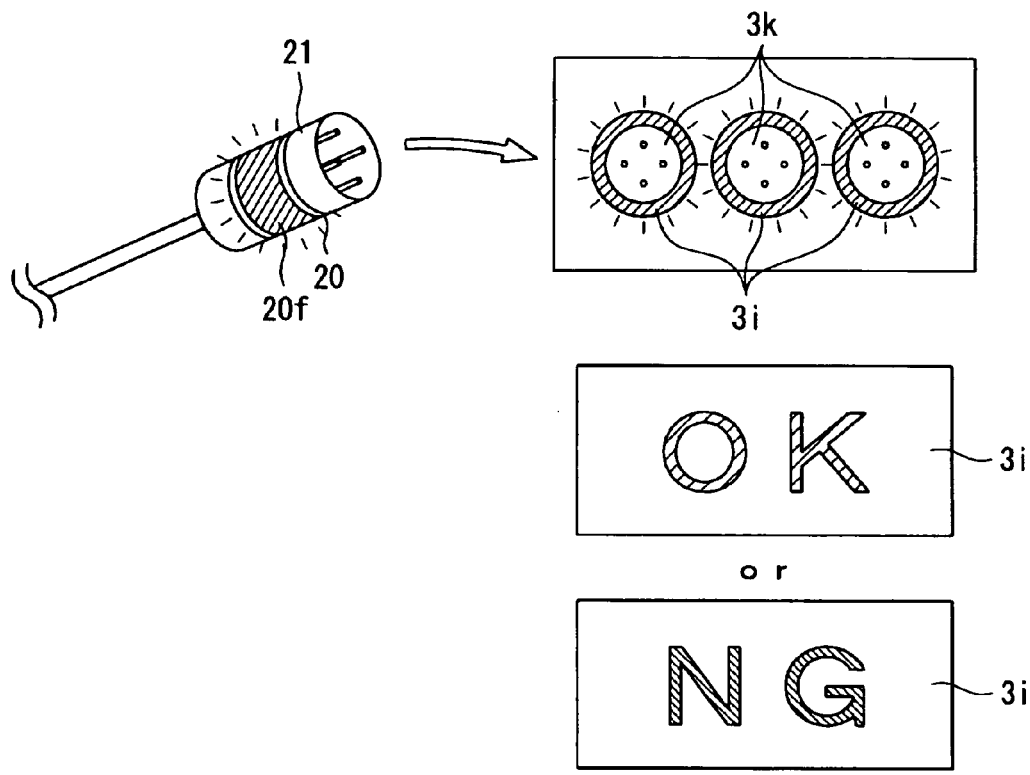
FIG. 4 shows a view illustrating an example of a second connecting part 21 and a first connecting part 3k.

The determining result notifying part 3h generates a control command for controlling operation of the display part 3i based on the determining result received from the availability determining part 3g, and sends it to the display part 3i. The display part 3*i* comprises a plurality of light-emitting elements, and notifies the determining result to a system-user by illuminating the light-emitting elements based on the command generated in the determining result notifying part 3*h*. For example, when the second connecting part 21 is determined to be available, the light-emitting elements are visually illuminated to blue, and when determined to be not available, the light-emitting elements are visually illuminated to red. Furthermore, it is also possible to blink the light-emitting elements corresponding to situations. It is also possible to display letters or an image with illumination of the light-emitting elements by control command. In the present embodiment, the display part 3*i* and display part 20*f* illuminate in the same color. FIG. 4 shows an example of the second connecting part 21 and the first connecting part 3*k*. As shown in this figure, the display part 20*f* and the display part 3*i* illuminate in the predetermined color by the second connecting part 21 approaching the first connecting part 3*k*, and the availability is notified. The display part 20*f* and display part 3*i* may be in a plurality of numbers, and as shown in FIG. 4, in addition to the illumination in the predetermined color, indication such as "OK", "NG" may be displayed on another display part.

When the second connecting part 21 is determined to be able to use the first connecting part 3*k* based on the determining result received from the availability determining part 3*g*, the service providing part 3*j* provides the predetermined service to the electric apparatus 22 through the first connecting part 3*k* and second connecting part 21 after it is confirmed that the second connecting part 21 is connected to the first connecting part 3*k*. On the other hand, when it is determined that the first connecting part 3*k* is not available to the second connecting part 21, the service providing is shut down even if the second connecting part 21 is connected to the first connecting part 3*k*.

The first connecting part 3*k* connects the electric apparatus. 22 through the second connecting part 21 connected to the first connecting part 3*k* in such a manner that the predetermined service can be received. The charging fee calculating part 3*l* calculates a charging fee of the user based on the service providing result acquired from a service providing part 3*j*, and sends the calculated result to the settlement server 4 through the data communicating part 3*e*.

A specific operation of the service providing system 1A will be described. The service providing device 3 in the service providing system 1A is assumed to provide a service of supplying electricity to the electric apparatus 22 as a predetermined service. A user of the connecting-part-equipped electric apparatus 2 brings the second connecting part 21 of the connecting-part-equipped electric apparatus 2 closer to the first connecting part 3*k* of the service providing device 3, and then the connecting-part-equipped electric apparatus 2 receives a response request signal from the service providing device 3. This response request signal is received by the contactless identification tag 20 attached to the second connecting part 20. As for the present embodiment, the service providing device 3 sends the response request signal with a predetermined frequency through the data sending part 3*b* by the data control part 3*c*.

When an antenna 20*h* of the contactless identification tag 20 receives the response request signal from the service providing device 3, a power generating part 20*g* generates drive power from the carrier wave of this response request signal, and supplies this drive power to each part of the contactless identification tag 20. Thus, the received signal is demodulated and the response request is extracted by the data receiving part 20*a* to which power is supplied. In response to this response request, the identification information (such as model number of the second connecting part) for determining whether the second connecting part 21 can connect the first connecting part 3*k* or not, and the information regarding the possessor of the connecting-part-equipped electric apparatus 2 are read out from the data storage part 20*d* by the data control part 20*c*, and then this information is sent to the service providing device 3 through the data sending part 20*b*.

On the other hand, when the service providing device 3 receives the above-described information from the connecting-part-equipped electric apparatus 2 through the data receiving part 3*a*, the data control part 3*c* reads out the information of the first connecting part 3*k*, which the service providing device 3 has, from the data storage part 3*d*, and sends this information to the availability determining part 3*g* together with the information of the second connecting part 21. In addition, the data control part 3*c* sends the acquired information on the possessor of the connecting-part-equipped electric apparatus 2 to the authenticating part 3*f*.

The availability determining part 3*g* determines whether the first connecting part 3*k* is available to the second connecting part 21 or not, based on the above-described acquired identification information and the information of the first connecting part 3*k*. Furthermore, the authenticating part 3*f* sends the authenticating request information including the above-described acquired information on the possessor of the connecting-part-equipped electric apparatus 2 to the settlement server 4 through the data control part 3*c* and the data communicating part 3*e*.

The settlement server 4, which received the authenticating request information, authenticates the possessor based on the information regarding the possessor included in this information and the customer information in the customer information database, and sends this authenticating result to the service providing device 3. The service providing device 3 receives the authenticating result sent from the settlement server 4 through the data communicating part 3*e* and the data control part 3*c*, and the data control part 3*c* sends this result to the authenticating part 3*f*. Furthermore, the authenticating part 3*f* sends the acquired authenticating result to the availability determining part 3*g*.

Upon acquiring the authenticating result from the authenticating part 3*f*, the availability determining part 3*g* finally determines whether the first connecting part 3*k* is available to the second connecting part 21 or not based on this authenticating result and the above described determining result. This determining result is sent to the determining result notifying part 3*h* and the service providing part 3*j*, and further, sent to the connecting-part-equipped electric apparatus 2 through the data control part 3*c* and the data sending part 3*b*.

Upon acquiring the determining result from the availability determining part 3*g*, the determining result notifying part 3*h* generates a control command for the display part 3*i* based on the determining result, and sends this command to the display part 3*i*. The display part 3*i* lights up the light-emitting elements in the predetermined color in response to the control command received from the determining result notifying part 3*h* and notifies the determining result to a user.

When the availability of the first connecting part 3*k* for the second connecting part 21 is detected, the determining result notifying part 3*h* generates a control command to light up the light-emitting elements so that the display part 3*i* becomes blue, and sends this command to the display part 3*i*. On the other hand, when the non-availability of the first connecting part 3*k* for the second connecting part 21 is detected, the determining result notifying part 3*h* generates a control command to light up the light-emitting element so that the display part 3*i* becomes red, and sends this command to the display part 3*i*.

That is, these control commands allow the display part 3*i* to light up in blue when the first connecting part 3*k* is available to the second connecting part 21, and to light up in red when not available. Furthermore, upon acquiring the determining result from the availability determining part 3*g*, the service providing part 3*j* conducts a control for supplying or shutting down electricity based on the determining result. In a normal state, the electricity is shut down. A user can manually set the supplying amount of electricity by operation of the operating part (not shown). That is, when the first connecting part 3*k* is determined to be available to the second connecting part 21, electricity is supplied to the electric apparatus 22 through the second connecting part 21 based on the content set by the operating part after connection of the second connecting part 21 to the first connecting part 3*k* is confirmed. On the other hand, when the first connecting part 3*k* is determined to be not available to the second connecting part 21, the electricity supply is kept shut down if in a shutting down status, and electricity is shut down if being supplied.

The contactless identification tag 20 in the second connecting part 21, which received the response information signal including the determining result from the service providing device 3 through the antenna 20, generates drive power from the carrier wave of the received response information signal in the power generating part 20*g*, and supplies the drive power to each part, as in the case of receiving the above-described response request signal. This allows the data receiving part 20*a*, to which power is supplied, to demodulate the received signal and extract the response information including the determining result, and to send it to the data control part 20*c*. The data control part 20*c* sends the information acquired from the data receiving part 20*a* to the status notifying part 20*e*.

Upon receiving the information from the data control part 20*c*, the status notifying part 20*e* generates and sends a control command to control the display to the display part 20*f* based on this information. Upon receiving the control command from the status notifying part 20*e*, the display part 20*f* lights up the light-emitting elements constituting the display part 20*f* in the predetermined color based on this command. As for the present embodiment, when the first connecting part 3*k* is available to the second connecting part 21, the status notifying part 20*e* generates a control command to light up the light-emitting elements in a manner such that the display part becomes blue, and sends this command to the display part 20*f*. On the other hand, when the first connecting part 3*k* is not available to the second connecting part 21, the status notifying part 20*e* generates a control command to light up the light-emitting elements in a manner such that the display part 20*f* becomes red, and sends this command to the display part 20*f*. Thereby, when the service providing device 3 is available, the display part 20*f* lights up in blue, and when the service providing device 3 is not available, it lights up in red.

Figure 5:
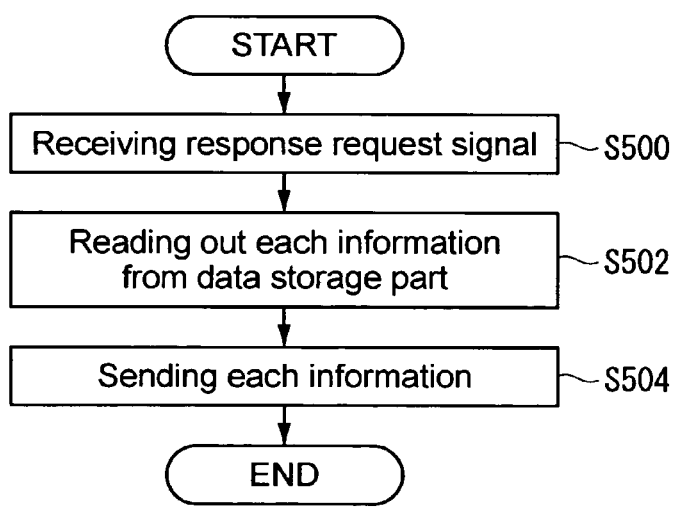
FIG. 5 shows a flowchart illustrating an operation processing for response request after power supply in the connecting-part-equipped electric apparatus 2.

Finally, a user of the connecting-part-equipped electric apparatus 2 compares the displayed content on the display part 20*f* and that on the display part 3*i*, and uses a service by connecting the second connecting part 21 to the first connecting part 3*k* when both of the display parts light up in blue. Furthermore, a flow of operation processing for the response request after supplying power in the connecting-part-equipped electric apparatus 2 will be described with reference to FIG. 5. FIG. 5 shows a flowchart illustrating an operation processing for the response request after supplying power in the connecting-part-equipped electric apparatus 2.

As shown in FIG. 5, first, proceed to Step S500, and then proceed to Step S502 after receiving the response request signal from the service providing device 3. At Step S502, the data control part 20*c* reads out the identification information of the second connecting part 21 and the information regarding the possessor of the connecting-part-equipped electric apparatus 2 from the data storage part 20*d*, and proceed to Step S504.

Figure 6:
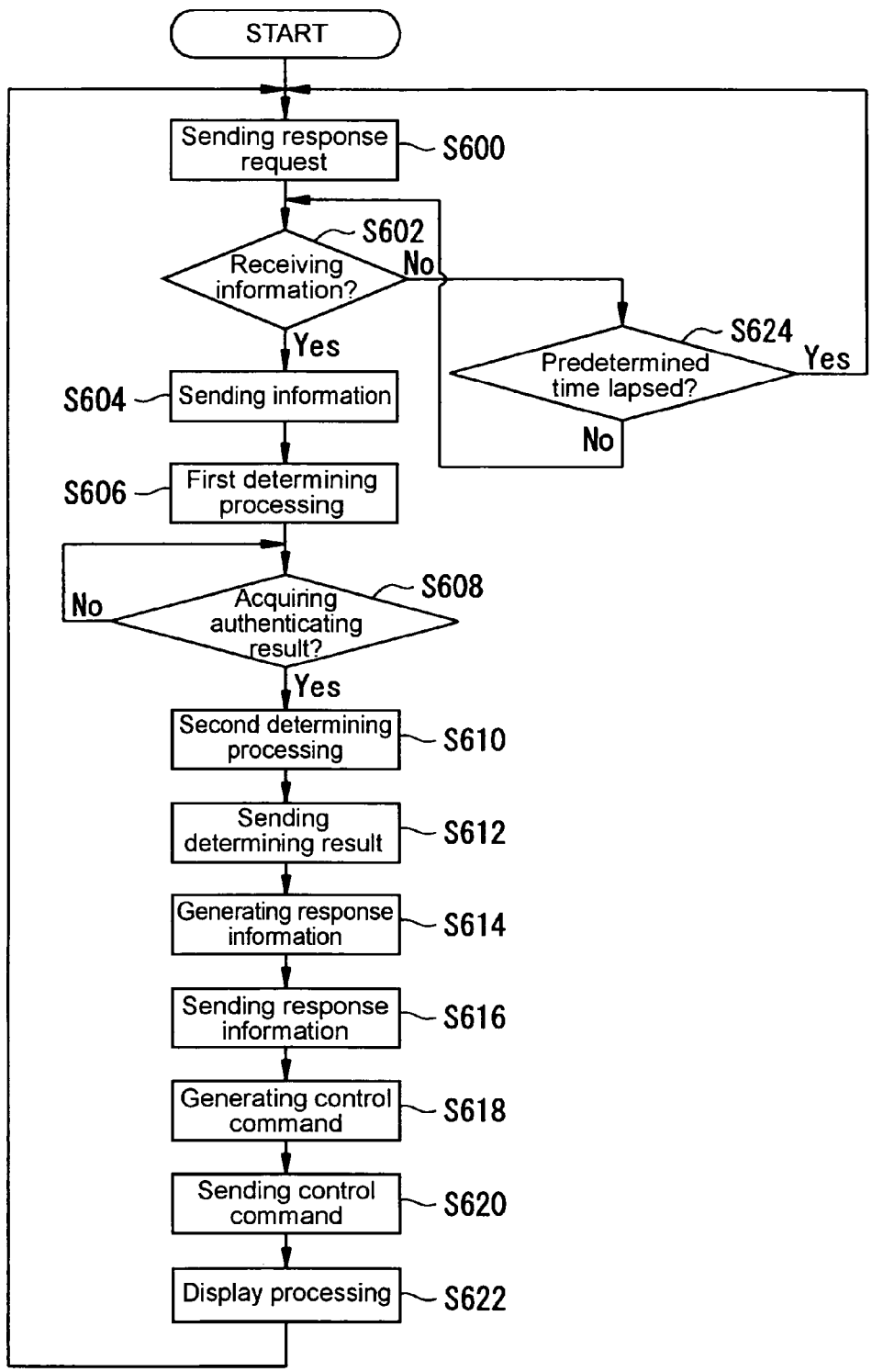
FIG. 6 shows a flowchart illustrating an operation processing of the service providing device 3.

At Step S504, the data control part 20*c* sends the information read out through the data sending part 20*b*. and antenna 20*h* to the service providing device 3 and ends the processing. Furthermore, a flow of the operating process of the service providing device 3 will be described with reference to FIG. 6. FIG. 6 shows a flow chart illustrating an operating process of the service providing device 3.

As shown in FIG. 6, the process first proceeds to Step S600, in which the data control part 3*c* sends the response request signal to the connecting-part-equipped electric apparatus 2 through the data sending part 3*b*, and the process proceeds to Step S602. At Step S602, the data control part 3*c* determines whether the identification information of the second connecting part 21 and the information regarding the possessor of the connecting-part-equipped electric apparatus 2 are received from the connecting-part-equipped electric apparatus 2 or not, and the process proceeds to Step S604, if reception is positively determined (Yes), and if reception is negatively determined (No), the process proceeds to Step S624.

At Step S604, the data control part 3*c* sends the identification information of the second connecting part 21 to the availability determining part 3*g*, and sends the information regarding the possessor of the connecting-part-equipped electric apparatus 2 to the authenticating part 3*f*, and then the process proceeds to Step S606. At Step S606, the availability determining part 3*g* reads out the information of the first connecting part 3*k* from the data storage part 3*d*, and determines whether the first connecting part 3*k* is available to the second connecting part 21 or not in terms of the physical match or the standard match, based on this information and the identification information of the first connecting part 3*k*, and then the process proceeds to Step S608.

At Step S608, the availability determining part 3*g* determines whether the authenticating result was acquired from the authenticating part 3*f* or not, and the process proceeds to Step S610, if acquisition was positively determined (Yes), and if acquisition was negatively determined (No), waits until the acquisition. At Step S610, the availability determining part 3*g* determines whether the first connecting part 3*k* is available to the second connecting part 21 or not based on the identification information at Step S606 and the authenticating result acquired at Step S608, and the process proceeds to Step S612.

At Step S612, the availability determining part 3*g* sends the determining result in Step S610 to the determining result notifying part 3*h* and the data control part 3*c*, and then the process proceeds to Step S614. At Step S614, the data control part 3*c* generates response information based on the acquired determining result, and the process proceeds to Step S616.

At Step S616, the data control part 3*c* sends the generated response information to the connecting-part-equipped electric apparatus 2 through the data sending part 3*b*, and the process proceeds to Step S618. At Step S618, the determining result notifying part 3*h* generates a control command for the display part 3*i* based on the acquired determining result, and then the process proceeds to Step S620. At Step S620, the determining result notifying part 3*h* sends the generated control command to the display part 3*i*, and then the process proceeds to Step S622.

At Step S622, the display part 3*i* illuminates the light-emitting elements based on the acquired control command, and then the process proceeds to Step S600. When the information from the connecting-part-equipped electric apparatus 2 is not received at Step S602 by the data control part 3*c* and the process proceeds to Step S624, the process determines whether the predetermined time has lapsed or not, and the process proceeds to Step S600 if the time is determined to have lapsed (Yes), and the process proceeds to Step S602 if the time is determined not to have lapsed.

Figure 7:
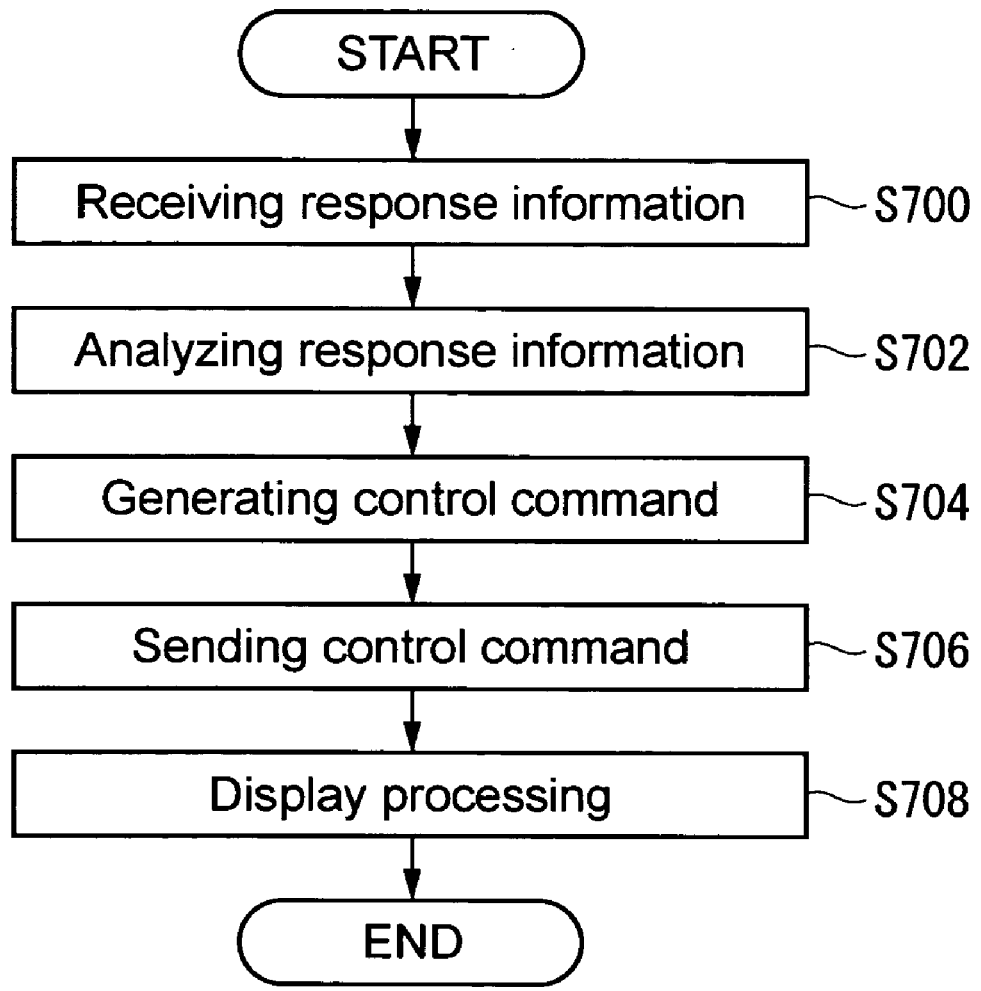
FIG. 7 shows a flowchart illustrating an operation processing for response information from the service providing device 3 after power supply in the connecting-part-equipped electric apparatus 2.

Furthermore, a flow of the operation processing for the response information from the service providing device 3 after supplying power in the connecting-part-equipped electric apparatus 2 will be described with reference to FIG. 7. FIG. 7 shows a flowchart illustrating an operating process for the response information from the service providing device 3 after supplying power in the connecting-part-equipped electric apparatus 2. As shown in FIG. 7, the process first proceeds to Step S700, in which the data control part 3*c* receives the response information from the service providing device 3 through the data receiving part 20*a*, and sends it to the status notifying part 20*e*, and the process proceeds to Step S702.

At Step S702, the status notifying part 20*e* analyzes the response information received from the data control part 20*c*, and then the process proceeds to Step S704. At Step S704, the status notifying part 20*e* generates a control command to control a display on the display part 20*f* based on the analyzed result, and then the process proceeds to Step S706. At Step S706, the first status notifying part 20*f* sends the generated control command to the display part 20*f*, and then the process proceeds to Step S708.

Figure 8:
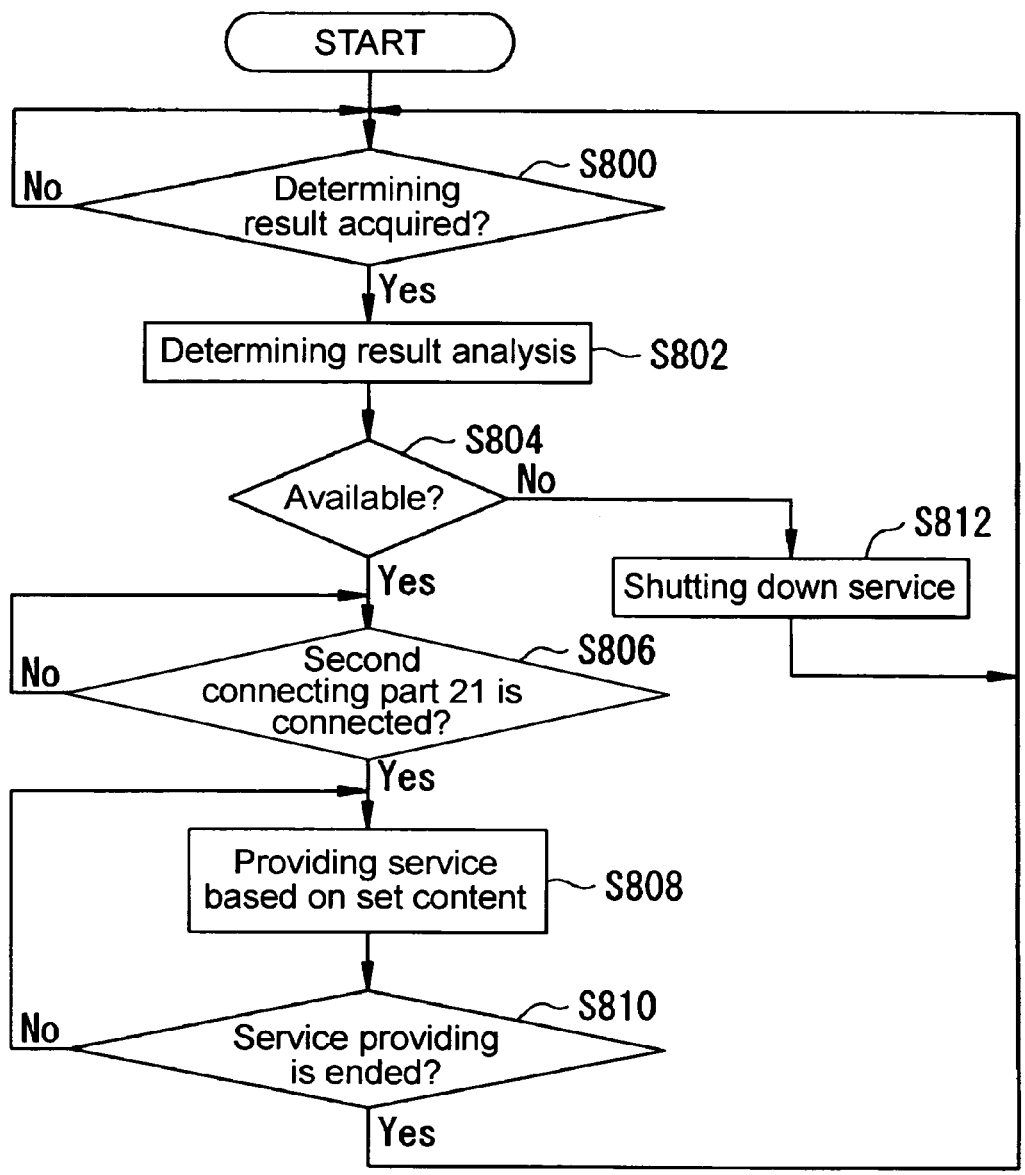
FIG. 8 shows a flowchart illustrating a service providing processing of the service providing part 3j in the service providing device 3.

At Step S708, the display part 20*f* illuminates the light-emitting elements in response to the control command acquired from the status notifying part 20*e*, and then the process ends. Furthermore, a flow of service providing processing of the service providing part 3*j* in the service providing device 3 will be described with reference to FIG. 8. FIG. 8 shows a flowchart illustrating a service providing processing of the service providing part 3*j* in the service providing device 3.

As shown in FIG. 8, the process first proceeds to Step 800, in which whether the determining result from the availability determining part 3*g* is acquired or not is determined, and if acquisition is positively determined (Yes), the process proceeds to Step S802, and if acquisition is negatively determined (No), the process waits until the acquisition. When the process proceeds to Step S802, the acquired determining result is analyzed, and the process proceeds to Step S804.

At Step S804, it is determined whether the first connecting part 3*k* is available to the second connecting part 21 or not based on the determining result, and the process proceeds to Step S806 if acquisition is positively determined (Yes), and proceeds to Step S812 if acquisition is negatively determined (No). When the process proceeds to Step S806, it is determined whether the second connecting part 21 is connected to the first connecting part 3*k* or not, and if connection is positively determined (Yes), the process proceeds to Step S808, if connection is negatively determined (No), the process waits until connection is made.

When the process proceeds to Step S808, service is provided to the electric apparatus 2 through the second connecting part 21 based on the content set by the operating part (not shown), and the process proceeds to Step S810. At Step S810, it is determined whether service providing is ended or not, and if the service providing was determined to be ended (Yes), the process proceeds to Step S800, and if the service providing was determined not to be ended (No), the process proceeds to Step S808.

Figure 9:
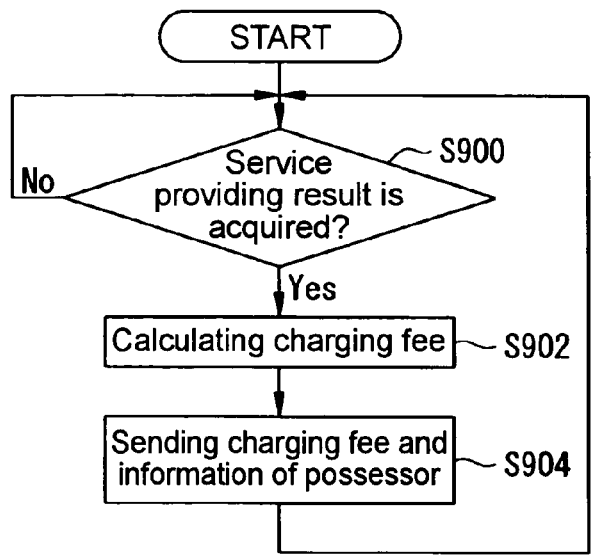
FIG. 9 shows a flowchart illustrating an operating processing of a charging fee calculating part 3l in the service providing device 3.
Figure 10:
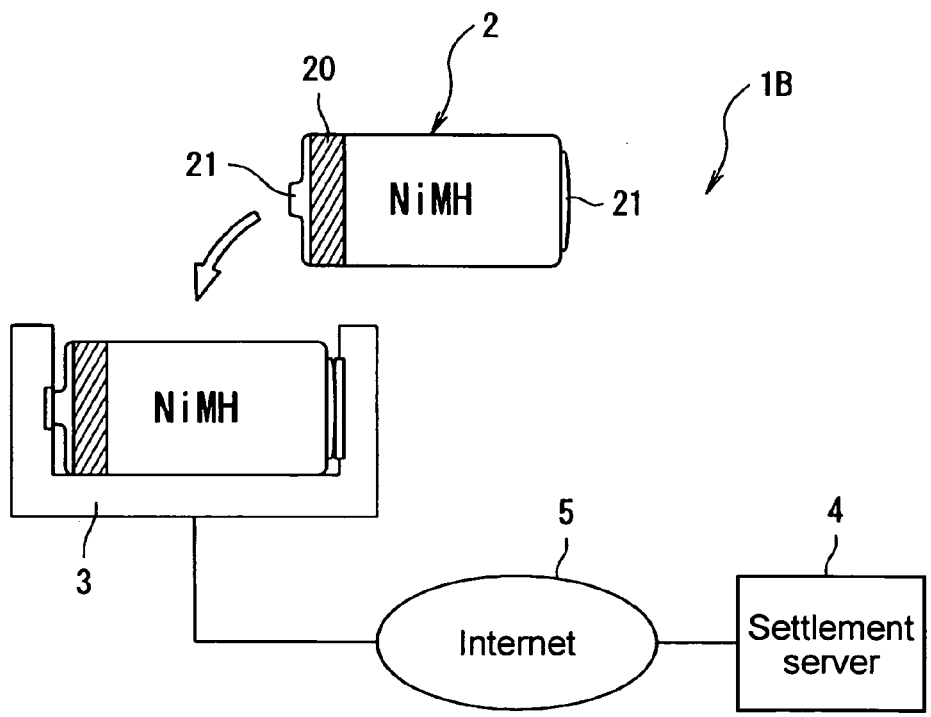
FIG. 10 shows a schematic structure of a service providing system 1B according to the present invention.

Furthermore, at Step S804, if non-availability was determined and the process proceeds to Step S812, the service is shut down and the process proceeds to Step S800. Furthermore, a flow of the operating process of a charging fee calculating part 3*l* in the service providing device 3 will be described with reference to FIG. 9. FIG. 9 shows a flowchart illustrating an operating processing of charging fee calculating part 3*l* in the service providing device 3.

As shown in FIG. 9, the process first proceeds to Step S900, and it is determined whether the service providing result is acquired from the service providing part 3*j* or not, and if acquisition is positively determined (Yes), proceed to Step S902, and if acquisition is negatively determined (No), the process waits until the acquisition. When the process proceeds to Step S902, the charging fee is calculated based on the service providing result per user, and the process proceeds to Step S904.

At Step S904, the calculated charging fee and information regarding the possessor of the connecting-part-equipped electric apparatus 2, which used the service, are sent to the settlement server 4 through the data control part 3*c* and data sending part 3*b*, and the process proceeds to Step S900. As described above, the second connecting part 21 approaches the first connecting part 3*k*, thereby it is possible to know whether the service providing device 3 has the first connecting part 3*k* corresponding to the second connecting part 21 or not. Therefore, it is possible to prevent a user of the second connecting part 21 from connecting the second connecting part 21 to a wrong connecting part.

Furthermore, the service providing device 3 can authenticate the possessor of the connecting-part-equipped electric apparatus 2, and provide or shut down the service based on the authenticating result. Therefore, for example, when the connecting-part-equipped electric apparatus 2 is stolen, it is possible to prevent the electric apparatus from being used by a robber. It is also possible to provide service corresponding to the authenticating result.

The data storage part 20*d* shown in FIG. 2 corresponds to the identification information storage means described in the first, fourth, seventh and ninth inventions. The information sending processing by the data control part 20*c* through the data sending part 20*b* and antenna 20*h* correspond to the identification information sending means described in the first, fourth, seventh and ninth inventions. The receiving processing of response information by the data control part 20*c* through the data receiving part 20*a* and antenna 20*h* corresponds to the determining result information receiving means described in the fifth and tenth inventions. The status notification processing by the status notifying part 20*e* and the display part 20*f* correspond to the status notifying means described in the fifth and tenth inventions. The power generating part 20*g* corresponds to the power generating means described in the fourth and ninth inventions. The data storage part 3*d* corresponds to the first connecting part information storage means described in the first and eleventh inventions. The receiving processing of each information from the connecting-part-equipped electric apparatus 2 conducted by the data control part 3*c* through the data receiving part 3*a* corresponds to the identification information acquiring means described in the first and eleventh inventions. The availability determining processing based on the identification information of the second connecting part 21 and the information of the first connecting part 3*k* in the response information generating part 3*e* correspond to the availability determining means described in the first through third, fifth, eleventh through thirteenth and fifteenth inventions. The authenticating processing regarding the possessor of the connecting-part-equipped electric apparatus 2 conducted by the authenticating part 3f and the settlement server 4 corresponds to the authenticating means described in the second and twelfth inventions. The sending processing of response information to the connecting-part-equipped electric apparatus 2 conducted by the data control part 3c through the data sending part 3b corresponds to the determining result information sending means described in the second and twelfth inventions. The availability notifying processing of the second connecting part 21 to the first connecting part 3k by the determining result notifying part 3h and the display part 3i corresponds to the determining result notifying means described in the first and eleventh inventions. The data sending processing to the connecting-part-equipped electric apparatus 2, using carrier wave of various signals, conducted by the data control part 3c through the data sending part 3b corresponds to the electromagnetic wave sending means for power supply described in the fourth and fourteenth inventions. The service providing part 3j corresponds to the electromagnetic wave sending means for power supply described in the third and thirteenth inventions. The charging fee calculating part 3l corresponds to the price calculating part described in the sixth and sixteenth inventions.

In the above-described embodiments, the service providing system 1A is used as a power supply service. However, the system is not limited to this, but may be used for data loading service such as music data and video data, and other services such as battery charging service by the service providing system 1B shown in FIG. 10. The authenticating processing regarding the possessor of the connecting-part-equipped electric apparatus 2 is conducted using the settlement server, however, this invention is not limited to this, but all of this processing may be conducted by the service providing device 3.

In the above-described embodiments, all of the service providing is conducted by the service providing device 3. However, the invention is not limited to this. To provide service such as data loading service, this system may take another structure that separately prepares a server for a database, downloads the necessary data from the server, and provides the data to the connected apparatus, for example.

What is claimed is:

1. A service providing system for providing a predetermined service to an apparatus from a service providing device comprising: a first connecting part provided on the service providing device; a second connecting part having one end connected to the apparatus and another end for apparent connection to the first connecting part; the second connecting part including: an identification information storage means for storing identification information of the second connecting part; and an identification information sending means for sending the identification information to the service providing device in response to a request from the service providing device; and the service providing device including: an identification information acquiring means for acquiring the identification information from the second connecting part approaching the first connecting part; a first connecting part information storage means for storing information of the first connecting part; an availability determining means for determining whether the first connecting part is available to the second connecting part based on the identification information acquired by the identification information acquiring means and information of the first connecting part; and a determining result notifying means for providing information indicating the determining result of the availability determining means to a system-user; an identification information acquiring means for acquiring the identification information from the second connecting part approaching the first connecting part; a first connecting part storage means for storing information of the first connecting part; an availability determining means for determining whether the first connecting part is available to the second connecting part based on the identification information acquired by the identification information acquiring means and the information of the first connecting part; and a determining result notifying means for providing information indicating the determining result of the availability determining means to a system-user; and a user information storage means for storing information of an authorized user of the predetermined service; and an authenticating means for authenticating the possessor, based on the information regarding the possessor of the second connecting part and the information of the authorized user, wherein the availability determining means determines whether the first connecting part is available to the second connecting part also based on the authenticating result of the authenticating means.

2. The service providing system according to claim 1, wherein the identification information includes information regarding a possessor of the second connecting part, and further comprising: a user information storage means for storing information regarding an authorized user of the predetermined service; and an authenticating means for authenticating the possessor based on the information regarding the possessor of the second connecting part and the information of the authorized user, wherein the availability determining means determines whether the first connecting part is available to the second connecting part also based on the authenticating result of the authenticating means.

3. The service providing system according to claim 2, wherein the service providing device comprises a price calculating means for calculating a price of the predetermined service provided to the apparatus, and a settling charging fee of the predetermined service to a possessor of the identification information based on a calculating result of the price calculating means and the identification information regarding the possessor.

4. The service providing system according to claim 1, wherein the service providing device comprises a service providing means for selectively providing and shutting down the predetermined service based on the determining result of the availability determining means.

5. The service providing system according to claim 1, wherein: the second connecting part comprises: a contactless identification tag, wherein the contactless identification tag comprises the identification information storage means, the identification information sending means, and a power generating means for generating drive power from an electromagnetic wave sent from the service providing device; and the service providing device comprises: an electromagnetic wave sending means for sending the electromagnetic wave for power supply to the second connecting part approaching the first connecting part.

6. The service providing system according to claim 1, wherein: the second connecting part comprises: a determining result information receiving means for receiving information including a determining result of the availability determining means sent from the service providing device; and a status notifying means for notifying a predetermined status of the second connecting part to the first connecting part to a system-user based on the information including the determining result received by the determining result information receiving means; and the service providing device comprises: a determining result information sending means for sending information including the determining result by the availability determining means to the second connecting part approaching the first connecting part.

7. The second connecting part of the service providing system according to claim 1, comprising: an identification information storage means for storing identification information of the second connecting part; and an identification information sending means for sending the identification information to the service providing device in response to a request from the service providing device.

8. The second connecting part according to claim 7, wherein the identification information includes information on a user of the second connecting part.

9. The second connecting part according to claim 7, comprising a contactless identification tag, wherein the contactless identification tag comprises the identification information storage means, the identification information sending means and a power generating means for generating drive power from an electromagnetic wave sent from the service providing device.

10. The second connecting part according to claim 7, comprising: a determining result information receiving means for receiving information including the determining result of the availability determining means sent from the service providing device; and a status notifying means for providing a predetermined status of the second connecting part to the first connecting part to a system-user based on the information including the determining result received by the determining result information receiving means.

11. The service providing device according to claim 1, comprising a service providing means for selectively providing and shutting down the predetermined service based on the determining result of the availability determining means.

12. The service providing device according to claim 1, comprising an electromagnetic wave sending means for sending an electromagnetic wave for power supply to the second connecting part approaching the first connecting part.

13. The service providing device according to claim 1, comprising a determining result information sending means for sending information including the determining result by the availability determining means to the second connecting part approaching the first connecting part.

14. The service providing device according to claim 1, comprising a price calculating means for calculating a price for the predetermined service provided to the apparatus.

* * * * *